United States Patent [19]
Thurston et al.

[11] Patent Number: 6,052,601
[45] Date of Patent: Apr. 18, 2000

[54] METHOD AND APPARATUS FOR USING PACE GROUPS IN A COMPARATOR

[75] Inventors: Jeffrey F. Thurston, Lake Zurich; David P. Helm, Carol Stream, both of Ill.

[73] Assignee: Motorola, Inc., Schaumburg, Ill.

[21] Appl. No.: 08/988,145

[22] Filed: Dec. 10, 1997

[51] Int. Cl.⁷ .................................................. H04B 7/00
[52] U.S. Cl. .......................................... 455/518; 455/508
[58] Field of Search ..................................... 455/507, 508, 455/521, 517, 518, 445, 132, 133; 370/338, 407

[56] References Cited

U.S. PATENT DOCUMENTS

| | | | |
|---|---|---|---|
| 4,143,321 | 3/1979 | Norsworthy | 325/67 |
| 4,317,218 | 2/1982 | Perry | 455/54 |
| 5,774,812 | 6/1998 | Hargrave et al. | 455/524 |

*Primary Examiner*—Reinhard J. Eisenzopf
*Assistant Examiner*—Naghmeh Mehrpour
*Attorney, Agent, or Firm*—Susan L. Lukasik

[57] ABSTRACT

An apparatus has a plurality of ports (209); a router (203), operating in conjunction with at least one of the plurality of ports, arranged and constructed to receive at least one signal and provide an output signal; and a pacer (205), operating in conjunction with one or more of the plurality of ports, arranged and constructed to receive the output signal and provide the output signal to at least one of the one or more of the plurality of ports. The apparatus may also include a voter (201), operating in conjunction with at least one of the plurality of ports, arranged and constructed to provide a voted signal to the router.

25 Claims, 2 Drawing Sheets

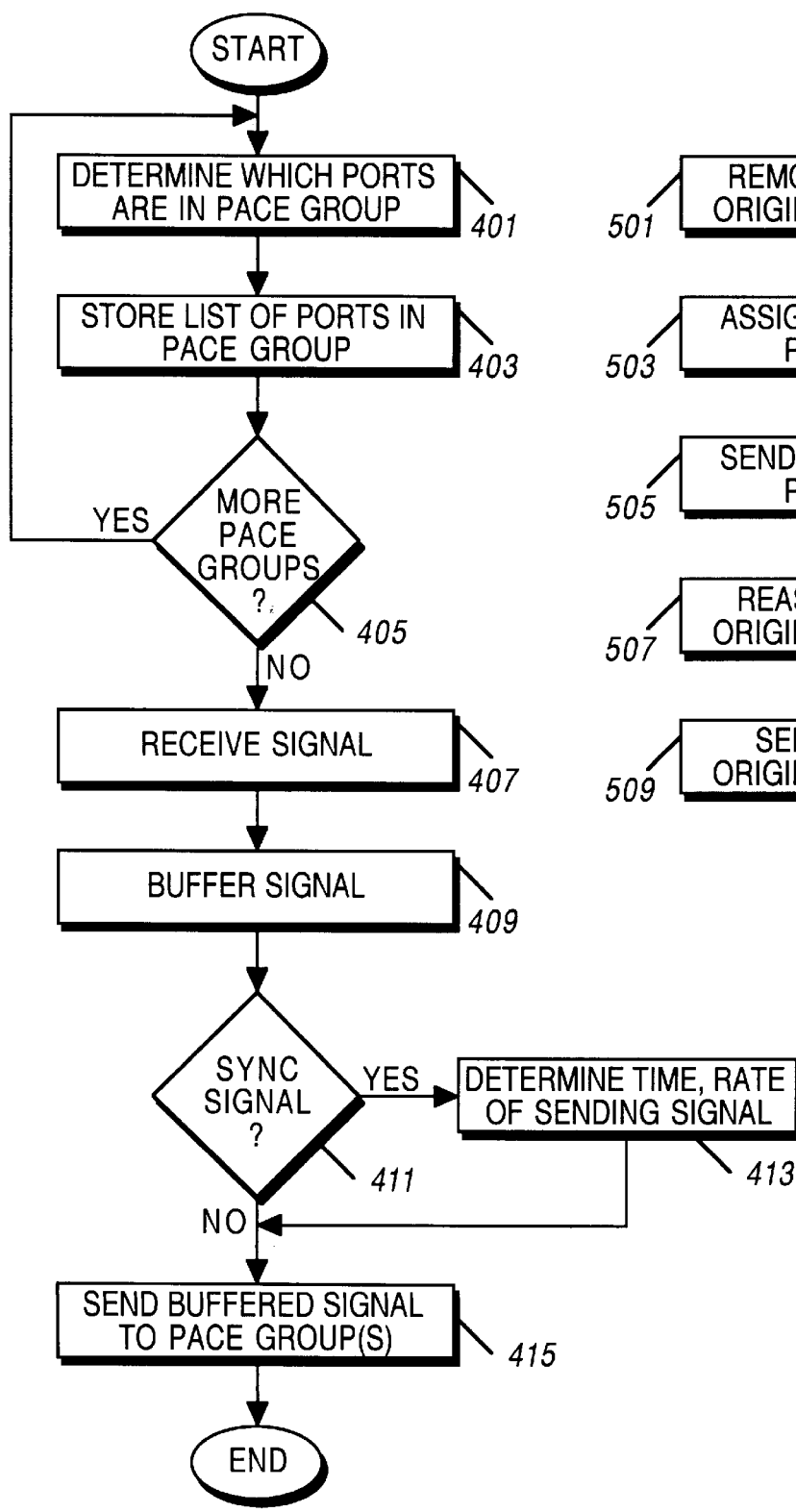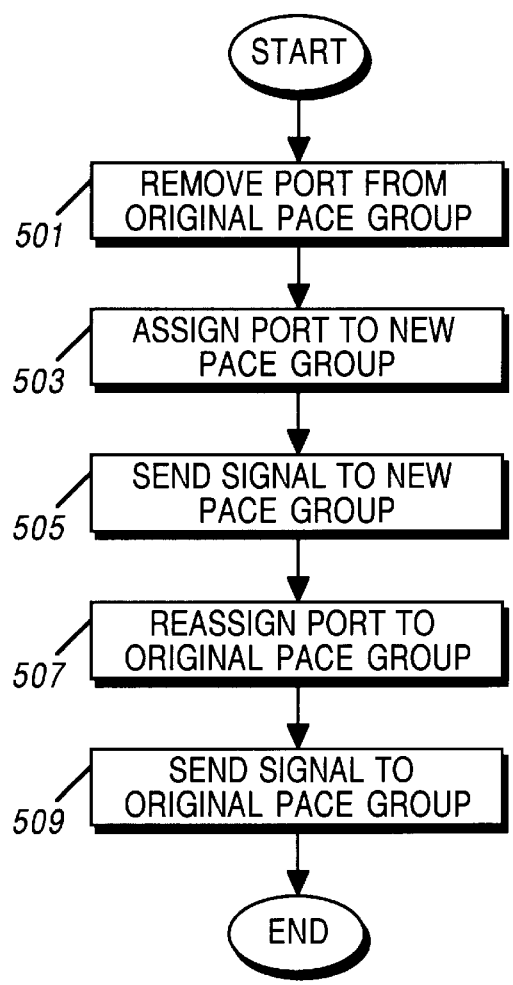
FIG. 4
FIG. 5

METHOD AND APPARATUS FOR USING PACE GROUPS IN A COMPARATOR

FIELD OF THE INVENTION

This invention relates to communication systems, including but not limited to comparators in radio frequency (RF) communication systems.

BACKGROUND OF THE INVENTION

In many radio communication systems designed to service a large area, it is often desirable to provide a number of receivers, each positioned at a different location within the area to be serviced. Typically, the receivers, which may be base stations or repeaters, have overlapping effective reception ranges so that any messages transmitted within the area will be picked up by at least one receiver on the same frequency or channel. As an example of such a system, a communication unit transmits via a radio frequency (RF) communication resource a message that is received by three remote receivers. Each of the receivers sends its received signal to a comparator, also known as a voter, typically by wireline communications. The comparator receives and compares each message from each of the receivers and outputs a message that is comprised of either an entire message from one of the receivers or a composite message comprised of segments of the messages received from one or more of the receivers. Each message may be comprised of a plurality of message frames.

Today's systems only provide for a single console to participate in any conversation, thereby preventing a multiple-console conversations, and the resulting benefits of having geographically separated console buildings, including redundancy for backup and more console positions, are not possible.

In addition, comparators output messages to a variety of external devices through the comparator's output ports. Ports are generally physical link connections to the external devices. The external devices include base stations, consoles (and/or console interfaces), and audio switches. Comparators also have one or more inputs from one or more input devices, such as base stations, consoles (and/or console interfaces), and audio switches. The act of switching from one set of inputs and one set of outputs to a different set of inputs and a different set of outputs causes buffering and synchronization issues that are typically unresolved or resolved through adding very large, often prohibitive, amounts of buffering or memory.

Accordingly, there is a need for an apparatus for and method of providing multiple-console conversations in a communication system and switching from one set of inputs and one set of outputs to a different set of inputs and a different set of outputs without creating buffering and synchronization issues.

BRIEF DESCRIPTION OF THE DRAWINGS

FIG. 4 is flowchart showing a method of providing pace groups in accordance with the invention.

FIG. 5 is flowchart showing a method of reassigning ports in pace groups in accordance with the invention.

DESCRIPTION OF A PREFERRED EMBODIMENT

Figure 1:
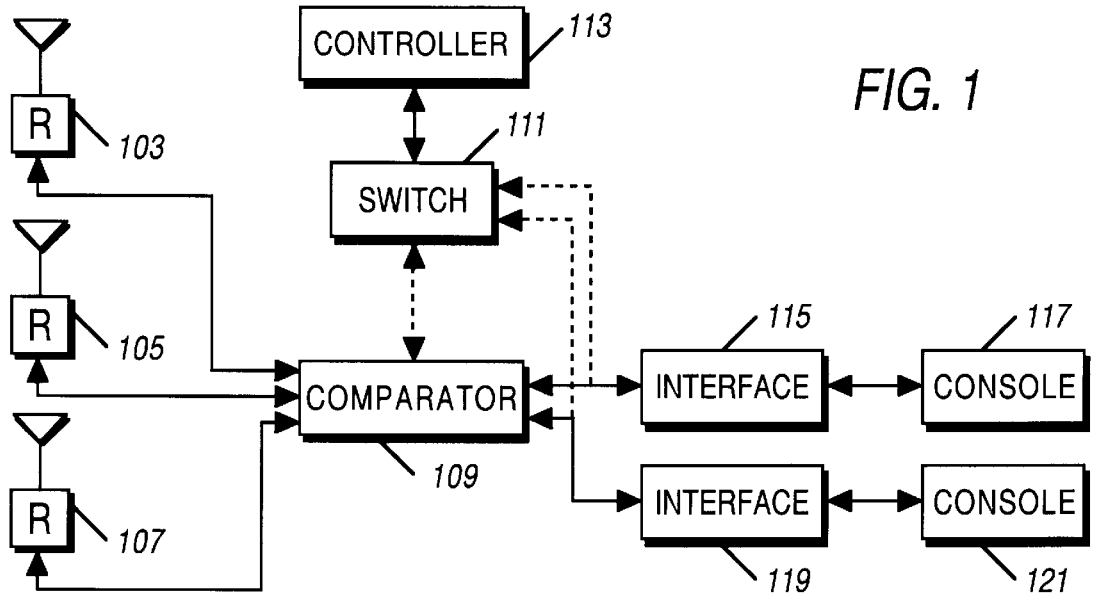
FIG. 1 is a block diagram of a communication system including a comparator in accordance with the invention.

The following describes an apparatus for and method of assigning comparator ports to pace groups. A pace group is a logical grouping of output ports. The pace group may comprise fewer than all of the comparator's ports, such that any number of input signals may be provided as any number of output signals for a comparator, limited only by the number of ports in the comparator. Information to the pace group is provided to the pace group so as to prevent under-running and over-running of the buffers operating in conjunction with the ports of the comparator.

In a comparator having a plurality of ports, wherein the plurality of ports operate in conjunction with a combination of base stations, console interfaces, and/or audio switches, a method of the present invention comprising the steps of determining which of the plurality of ports are in a first pace group, storing a list of the ports in the first pace group, receiving a signal, buffering the received signal once for the first pace group, and sending the received signal to each of the ports in the first pace group in a synchronized manner. The received signal may be: an inbound voted signal; a signal from a console connected to a console interface that is operating in conjunction with a port in the first pace group; and/or a signal from an audio switch operating in conjunction with a port in the first pace group.

The ports in the first pace group may operate in conjunction with: at least two console interfaces and at least one base station; at least one console interface, at least one base station, and at least one audio switch; at least one base station and at least one audio switch.

When the ports in the first pace group operate in conjunction with only one or more base stations, the method may further comprise steps of determining which ports are in a second pace group, wherein the second pace group is comprised of no base stations, storing a list of the ports in the second pace group, and sending the received signal to each of the ports in the second pace group in a synchronized manner.

When the received signal is comprised of a plurality of frames, and the step of sending may comprise determining a time for sending each frame of the received signal. The step of determining a time may comprise determining a rate of sending the frames of the received signal to prevent a receive buffer in a base station in the first pace group from at least one of over-running and under-running.

The method may further comprising the steps of determining which ports are in a second pace group, storing a list of the ports in the second pace group, and sending the received signal to each of the ports in the second pace group in a synchronized manner.

When the ports in the first pace group and the second pace group operate in conjunction with at least two console interfaces, the method may further comprising the steps of removing a port operating in conjunction with one of the at least two console interfaces from one of the first pace group and the second pace group and reassigning the port to a third pace group. In addition, a different signal may be sent to the ports in the third pace group in a synchronized manner, and the port reassigned to one of the first pace group and the second pace group.

When the ports in the first pace group operate in conjunction with at least two console interfaces, the method may further comprising the steps of removing a port operating in conjunction with one of the at least two console interfaces from the first pace group and reassigning the port to a second pace group. In addition, a different signal may be sent to the ports in the second pace group, and the port reassigned to the first pace group.

In a comparator having a plurality of ports, wherein the plurality of ports operate in conjunction with a combination of base stations, console interfaces, and/or audio switches, another method of the present invention comprises the steps of determining which of the plurality of ports are in a first pace group, sending a first signal to each of the ports in the first pace group, removing at least one of the ports from the first pace group and assigning the at least one of the ports from the first pace group to a second pace group, and sending a second signal to each of the ports in the second pace group. The method may further comprise the steps of reassigning the at least one of the ports in the second pace group to the first pace group, and sending a third signal to each of the ports in the first pace group. The first signal and the third signal may be parts of one message.

An apparatus of the present invention comprises a plurality of ports 209; a router 203, operating in conjunction with at least one of the plurality of ports, arranged and constructed to receive at least one signal and provide at least one output signal; and a pacer 205, operating in conjunction with one or more of the plurality of ports, arranged and constructed to receive the at least one output signal and provide the at least one output signal to at least one of the one or more of the plurality of ports. The apparatus may also include a voter 201, operating in conjunction with at least one of the plurality of ports, arranged and constructed to provide a voted signal to the router. The pacer may operate in conjunction with the plurality of ports and provide the at least one output signal to a selected group of the plurality of ports. The pacer may comprise a single buffer for storing the at least one output signal. The pacer may comprise two buffers, where the at least one output signal is stored in each of the two buffers.

A block diagram of an RF communication system including a comparator is shown in FIG. 1. A plurality of receiving devices 103, 105, and 107, which may be receivers (receive-only stations), base stations, and/or repeaters, are connected to a comparator 109. The comparator 109 may be an ASTROTACT™ 3000 comparator available from Motorola, Inc. In a trunked communication system, an audio switch 111, which routes analog and digital information between a master site and selected sites, is connected to the comparator 109, a controller 113, and one or more consoles 117 and 121 with interfaces 115 and 119, and the interfaces 115 and 119 are not connected to the comparator 109. The switch 111 provides system information and a communication path to the controller 113, which may be a Zone Controller available from Motorola, Inc. The switch 111 may be an Ambassador Electronics Bank, also available from Motorola, Inc.

In a conventional (or non-trunked) communication system, the consoles 117 and 121 via their interfaces 115 and 119 are coupled with the comparator directly, and neither a switch 111 nor controller 113 are present in a conventional system. Consoles 117 and 121 generally provide for dispatch communications in a radio frequency communication system. The interface 115 or 119 may be integrated into the console, or may be a separate device in the communication system as shown in FIG. 1, but such a difference in the architecture of the interface will not effect the successful practice of the present invention. When a signal is referred to as coming from or going to a console 117 or 121, such a signal is assumed to come through either an external interface 115 or 119 or an interface within the console 117 or 121 that generally interfaces between the console 117 or 121 and any device external to the console 117 or 121. The interface 115 or 119 provides an interface between the console and the rest of the communication system. Although only three repeaters and two consoles are shown in the diagram of FIG. 1, the present invention will be successfully implemented with more or less than three repeaters and more or less than two consoles.

Figure 2:
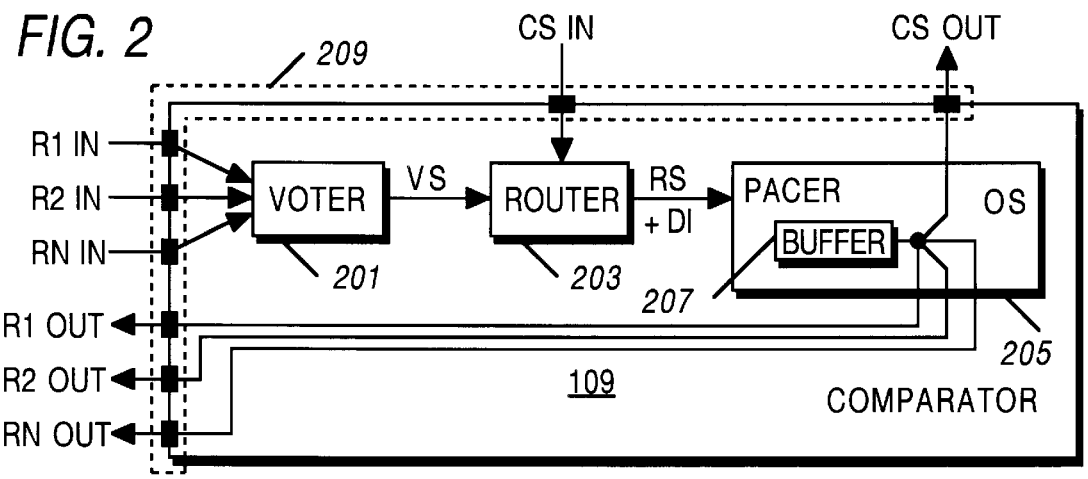
FIG. 2 is a block diagram of a comparator for use in a conventional communication system in accordance with the invention.

A block diagram of a comparator 109 as may be used in a conventional communication system is shown in FIG. 2. The comparator 109 generally comprises a voting device generally referred to as a voter 201 that receives a plurality of input signals R1, IN, R2 IN, through RN IN. The voter 201 provides an output signal that comprises either one of these input signals or a signal that is a composite of parts of one or more of the input signals. The output signal of the voter, VS, is output to a router 203. The router 203 determines the ports to which the comparator output signal should be sent. This set of ports will be referred to as a pace group. The router 203 also receives an input signal, CS IN, from a console 117 or 121, via the console interface 115 or 119. The router 203 outputs RS, by determining which signal it should output, either VS or CS IN or both VS and CS IN, and outputs the chosen signal(s), RS. In the preferred embodiment, the comparator 109 is configurable to prioritize signals differently based on their source. The typical comparator 109 configuration ranks the CS IN signal with a higher priority than the signal VS. With the typical comparator configuration, if a VS signal is present and being output by the comparator, when a CS IN signal is received, the comparator 109 stops outputting the signal VS to one set of ports and starts outputting the CS IN signal to the same set of ports, and may continue sending the VS signal to a different set of ports without interruption. When the CS IN signal stops, the comparator 109 resumes outputting the signal VS to both sets of ports, if the signal VS is still present, by creating a single pace group. A system operator can configure the signal VS to have a higher priority than the CS IN signal. The router 203 outputs the signal(s) RS as well as destination information (DI) to a pacer 205. The destination information comprises a list of port information in the form of port identifications for the members of the pace group(s) for which the signal(s) RS is intended.

Figure 3:
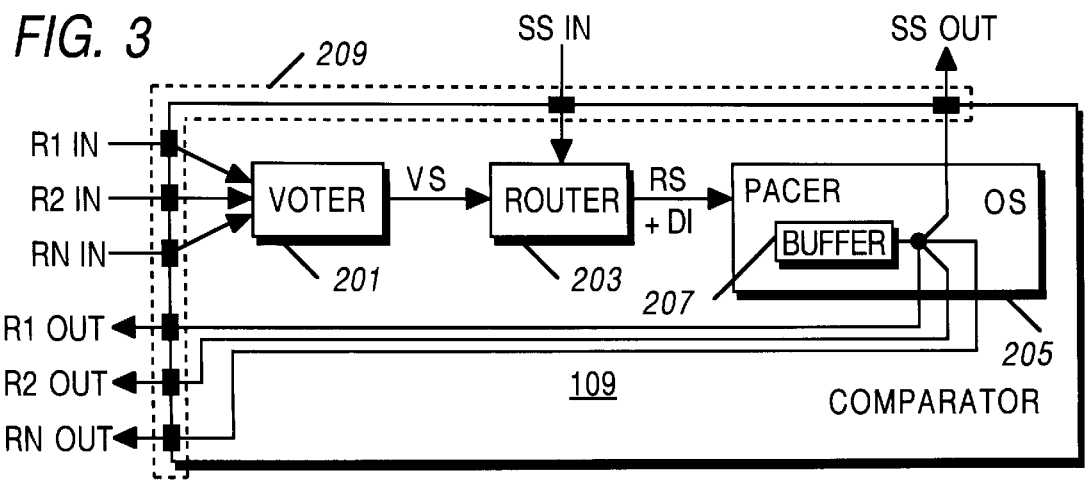
FIG. 3 is a block diagram of a comparator for use in a trunked communication system in accordance with the invention.

The pacer 205 comprises one or more buffers 207 in the preferred embodiment. In particular, the pacer 205 comprises one buffer 207 for each pace group in the preferred embodiment. The pacer 205 strips off the destination information, DI, and stores the signal(s) RS in its buffer(s) 207. In the preferred embodiment, the pacer 205 determines the rate of sending the frames of the signal(s) RS to the comparator's ports 209 so as to prevent overrunning and under-running of the buffer within the external device (such as a base station) attached to each port. The ports 209 of the comparator 109 are the input and output ports between the comparator 109 and the external devices that communicate with and otherwise operate in conjunction with the comparator 109 via the ports 209, including the repeaters 103, 105, and 107, the switch 111, and the consoles 117 and 121. In a typical conventional system, no switch 111 is present. The pacer 205 outputs output signal(s) OS, which are a synchronized version of the signal(s) RS in the preferred embodiment. The pacer 205 sends the information from the buffer 207 out to the ports 209 selected by the router 203, such that only one buffer is needed for each pace group. Here, the comparator is shown with output ports for a single console and N repeaters, although additional consoles may be connected to the comparator 109. Although the drawings of FIG. 2 and FIG. 3 show a different port for the input to a device and a different port for the output of the same device, a single two-way port may be used instead, as is the case in the preferred embodiment. One-way ports are depicted in FIG. 2 and FIG. 3 to more simply illustrate the signal flows.

The use of the comparator in a trunked communication system is shown in the block diagram of FIG. 3. Basically the same comparator architecture is utilized, except that has a switch 111 is coupled to the comparator 109 instead of a console 117 or 121, with input and output signals SS IN and SS OUT, respectively, interfacing to the comparator's ports 209. This embodiment is particularly useful for a trunked application where audio may be routed through the switch 111 to consoles 117 and 121 and other sites and/or zones within the communication system. As in the conventional case, the ports 209 of the comparator 109 are the input and output ports between the comparator 109 and the external devices that communicate with the comparator 109, such as the repeaters 103, 105, and 107, the switch 111, and the consoles 117 and 121. For inbound signals, from a system perspective, the voter 201 receives a plurality of input signals R1 IN, R2 IN, through RN IN and provides an output signal that comprises either one of these input signals or a signal that is a composite of parts of one or more of the input signals. The voter's 201 output signal, VS, is output to the router 203. As in the conventional case, the router 203 determines the set of ports in the pace group to which the comparator output signal should be sent. The router 203 then forwards the voter's 201 output signal VS as its output signal RS with the DI to the pacer 205, which buffers the signal to be output as the comparator output signal OS, which is a synchronized version of the signal RS, via the switch port as the signal, SS OUT.

The signal is then transformed to an output signal from a system perspective by the switch 111, by selecting either the SS OUT signal from this comparator or a signal from another source, such as a comparator signal from another site or zone, a console signal from any site or zone, or a stand-alone IntelliRepeater™ base station site. The switch 111 outputs the system's output signal to the comparator as input signal SS IN to the router 203. The router 203 outputs SS IN as one of its output signals, RS, and sends SS IN as RS as well as the destination information (DI) to the pacer 205. During this time, the pacer 205 continues to send the VS signal as one of the output signals, RS, of the router 203 to the switch port as the signal SS OUT. Thus, at least two output signals RS from the router 203 are input to the pacer 205 in the trunked example. The destination information DI comprises a list of base station ports in this outbound trunked situation. The pacer 205 strips off the destination information, DI, and stores the signals RS in its buffers 207. In the preferred embodiment, the pacer 205 determines the rate of sending the frames of the signals RS to the comparator's ports 209 so as to prevent overrunning and underrunning of the buffer within the external device (such as a base station) attached to each port. In the outbound trunked case, the pacer 205 sends the information from the buffer 207 to the base station output ports 209 selected by the router 203, such that only one buffer is needed for each pace group. In the preferred embodiment, a single pace group is used for all of the base stations 103, 105, and 107. The output signals OS from the pacer 205 are synchronized versions of the signals RS in the preferred embodiment.

A method of pacing signals is shown in the flowchart of FIG. 4. At step 401, it is determined which ports are in a pace group. This determination is made by the router 203 in the preferred embodiment. At step 403, a list of ports in the pace group are stored. There may be one or more pace groups involved for a voted signal. In the preferred embodiment, a separate buffer 207 in the pacer 205 is used for each pace group. At step 405, it is determined if there are more pace groups that need to be created. If more pace groups need to be created, the process continues with step 401, and if all pace groups have been created, the process continues to step 407. Typically, one or two pace groups are utilized in a comparator 209. In the preferred embodiment, one pace group includes ports associated with all the base stations operating with the comparator 109, and a second pace group includes all the remaining ports, i.e., the non-base station ports. In step 407, a signal is received and buffered at step 409. In the preferred embodiment, the signal is the RS signal output by the router 203 and stored in the pacer buffer 207.

At step 411, it is determined if it is desired to synchronize the signal in any other way than to simply send the signal to each port at the same time. If it is desired to so synchronize the signal, the process continues with step 413, where the time and rate of sending the signal is determined. In the preferred embodiment, the time and rate of sending the signal are selected such that over-running and under-running of the buffers of the devices attached to the ports in the pace group does not occur. Typically, each of the devices external to the comparator 109 has a receive buffer. For example, a base station's 103 receive buffer needs to be properly fed in order to prevent over-run and under-run buffer conditions, which could lead to the base station resetting or dekeying, respectively, at undesired times. Such a problem may occur in simulcast systems. Specific times for sending each frame of a message divided into frames may also be determined. In addition, other information such as simulcast launch times may be determined. The process then continues with step 415 from step 413 or if it is desired not to synchronize the signal at step 411. At step 415, the buffered signal is sent to the pace groups, wherein each pace group sends the message stored in its buffer to each port in the pace group at the same time, and using any times, rates, or other information determined at step 413.

A method of reassigning ports in pace groups is shown in the flowchart of FIG. 5. At step 501, a port is removed from its original pace group. The port is then assigned to a new pace group at step 503. At step 505, a signal is sent to the new pace group to which the port was reassigned. And at step 507, the port is then reassigned to its original pace group. At step 509, the signal is set to the original pace group, which now includes the port which was removed. Because of the use of the pace group, the port which has now been replaced in its original pace group, may continue to communicate in a message which it was removed from, and continue in a synchronous manner with the reception of the message going forward after it has received a prior message.

An example of a use of the method shown in FIG. 5 is the situation where dual console control may be desired for a single call. At the beginning of the call, both consoles 117 and 121 belong to the same pace group. The base stations 103, 105, and 107 may also belong in the same pace group, or may belong to their own pace group. In this example, assume the base stations and consoles are in the one pace group at the beginning of the call. If, during the call, the operator of the first console wishes to speak to the operator of the second console 121, the router 203 removes the second console 121 from the pace group, and places it in its own pace group. The audio from the first console 117 is routed to the second console 121 only using the second console's pace group. The audio from the call continues to be routed to the remainder of the original pace group while the second console 121 receives audio from the first console 117. When the first console 117 has finished sending audio to the second console 121, the second console 121 is removed from its own pace group and placed back in the original pace group, so the second console 121 can rejoin the original call still in progress. The second console 121 is synchronized with the rest of the pace group because all members of the pace group receive their data from the same source, a single buffer 207. Thus, multiple different input signals and output signals can be handled through a single comparator, limited only by the number of ports on the comparator.

Although the use of pace groups in the present invention has been described with respect to comparators, similar benefits and advantages may be gained by applying the use of pace groups to other devices that output one or more input signals to one or more output signals, such as computers and information servers.

Previously, comparators employed a buffer for each of its output ports, and the comparator's output signal was sent to each of its output ports from its associated buffer. Such comparators only provided for an output signal to be sent to each port, or no ports, but did not allow a message to be sent to a subset of all the ports. Further, only one input signal could be handled. As a result, multiple console systems were not possible, and hence multiple consoles could not participate in the same conversation. The present invention provides for different pace groups, which may include less than of all the ports, so that in bound and outbound signal flexibility is possible. Any number of messages may be received and sent to any number of outbound ports, limited only by the number of ports on the comparator. Prior comparators utilized an output buffer for each comparator port. The present invention provides for a method of utilizing only one output buffer for the entire comparator, or alternatively one output buffer for each pace group.

The present invention allows for multiple consoles to operate in a single conversation, with the advantage of geographical separation and ability to have redundant consoles. Both consoles and all other devices are time aligned, by using pace groups. In general, multiple signals may be sent to different stations of any grouping, and in general, N×N switching of signals to different ports can be supported. The resultant advantage includes the ability to add other input devices with other routing characteristics. Dynamically adding and removing ports from a pace group and keeping all ports in the pace group synchronized provides for efficient and smooth communications in the communication system, and maintaining synchronization of signals in the same pace group at all times. N×N switching is provided with time synchronization of a signal without the need for a large number of buffers. Any number of input signals can be provided to any number of output ports. The base station's buffers are fed signals at a pace in that prevents over-run and under-run buffer conditions, thereby preventing resetting and dekeying, respectively, during transmission of a voted signal or at other undesired times, and the use of a single pace group for all the base stations provides a mechanism for making this process more reliable.

What is claimed is:

1. In a comparator having a plurality of ports, wherein the plurality of ports operate in conjunction with a combination of base stations, console interfaces, and/or audio switches, a method comprising the steps of:

determining which of the plurality of ports are in a first pace group;

storing a list of the ports in the first pace group;

receiving a signal;

buffering the received signal once for the first pace group;

sending the received signal to each of the ports in the first pace group in a synchronized manner.

2. The method of claim 1, wherein the received signal is a signal from a console connected to a console interface that is operating in conjunction with a port in the first pace group.

3. The method of claim 1, wherein the received signal is an inbound voted signal.

4. The method of claim 1, wherein the received signal is from an audio switch operating in conjunction with a port in the first pace group.

5. The method of claim 1, wherein the ports in the first pace group operate in conjunction with at least two console interfaces and at least one base station.

6. The method of claim 1, wherein the ports in the first pace group operate in conjunction with at least one console interface, at least one base station, and at least one audio switch.

7. The method of claim 1, wherein the ports in the first pace group operate in conjunction with at least one base station and at least one audio switch.

8. The method of claim 1, wherein the ports in the first pace group operate in conjunction with only one or more base stations, further comprising the steps of:

determining which ports are in a second pace group, wherein the second pace group is comprised of no base stations;

storing a list of the ports in the second pace group;

sending the received signal to each of the ports in the second pace group in a synchronized manner.

9. The method of claim 1, wherein the received signal is comprised of a plurality of frames, and wherein the step of sending comprises determining a time for sending each frame of the received signal.

10. The method of claim 9, wherein the step of determining a time comprises determining a rate of sending the frames of the received signal to prevent a receive buffer in a base station in the first pace group from at least one of over-running and under-running.

11. The method of claim 1, further comprising the steps of:

determining which ports are in a second pace group;

storing a list of the ports in the second pace group;

sending the received signal to each of the ports in the second pace group in a synchronized manner.

12. The method of claim 11, wherein the ports in the first pace group and the second pace group operate in conjunction with at least two console interfaces, further comprising the steps of:

removing a port operating in conjunction with one of the at least two console interfaces from one of the first pace group and the second pace group;

reassigning the port to a third pace group.

13. The method of claim 12, further comprising the step of sending a different signal to the ports in the third pace group.

14. The method of claim 12, reassigning the port to one of the first pace group and the second pace group.

15. The method of claim 1, wherein ports in the first pace group operate in conjunction with at least two console interfaces, further comprising the steps of:

removing a port operating in conjunction with one of the at least two console interfaces from the first pace group;

reassigning the port to a second pace group.

16. The method of claim 15, further comprising the step of sending a different signal to the ports in the second pace group.

17. The method of claim 15, reassigning the port to the first pace group.

18. In a comparator having a plurality of ports, wherein the plurality of ports operate in conjunction with a combination of base stations, console interfaces, and/or audio switches, a method comprising the steps of:

determining which of the plurality of ports are in a first pace group;

sending a first signal to each of the ports in the first pace group;

removing at least one of the ports from the first pace group and assigning the at least one of the ports from the first pace group to a second pace group;

sending a second signal to each of the ports in the second pace group.

19. The method of claim 18, further comprising the steps of:

reassigning the at least one of the ports in the second pace group to the first pace group;

sending a third signal to each of the ports in the first pace group in a synchronized manner.

20. The method of claim 19, wherein the first signal and the third signal are part of one message.

21. An apparatus comprising:

a plurality of ports;

a router, operating in conjunction with at least one of the plurality of ports, arranged and constructed to receive at least one signal and provide at least one output signal; and a pacer, operating in conjunction with two or more of the plurality of ports, arranged and constructed to receive the at least one output signal and provide at least one output signal to at least two of the two or more of the plurality of ports in a synchronized manner.

22. The apparatus of claim 21, further comprising a voter, operating in conjunction with at least one of the plurality of ports, arranged and constructed to provide a voted signal to the router.

23. The apparatus of claim 21, wherein the pacer operates in conjunction with the plurality of ports and provides the at least one output signal to a selected group of the plurality of ports.

24. The apparatus of claim 21, wherein the pacer comprises a single buffer for storing the at least one output signal.

25. The apparatus of claim 21, wherein the pacer comprises two buffers, and wherein the at least one output signal is stored in each of the two buffers.

* * * * *